United States Patent

[11] 3,607,129

[72] Inventor Don B. Carson
  Mount Prospect, Ill.
[21] Appl. No. 27,784
[22] Filed Apr. 13, 1970
[45] Patented Sept. 21, 1971
[73] Assignee Universal Oil Products Company
  Des Plaines, Ill.

[54] APPARATUS FOR CATALYTIC CRACKING
  4 Claims, 1 Drawing Fig.
[52] U.S. Cl. ................................................. 23/288 S,
  208/161, 208/164, 208/155, 23/1 F
[51] Int. Cl. ........................................................ B01j 9/20
[50] Field of Search .......................................... 23/288.3 S;
  208/153, 155, 156, 161, 164

[56] References Cited
UNITED STATES PATENTS
2,718,491  9/1955  Green........................... 23/288.3 S Primary Examiner—James H. Tayman, Jr.
Attorneys—James R. Hoatson, Jr. and Robert W. Erickson ABSTRACT: Apparatus comprising a riser cracking reaction zone and a reaction zone vessel, said vessel having disposed therein a first and second particle separation means, said second particle separation means is connected to said riser reaction zone and said first particle separation means is connected to an outlet stream contained in said reaction zone vessel.

PATENTED SEP 21 1971  3,607,129
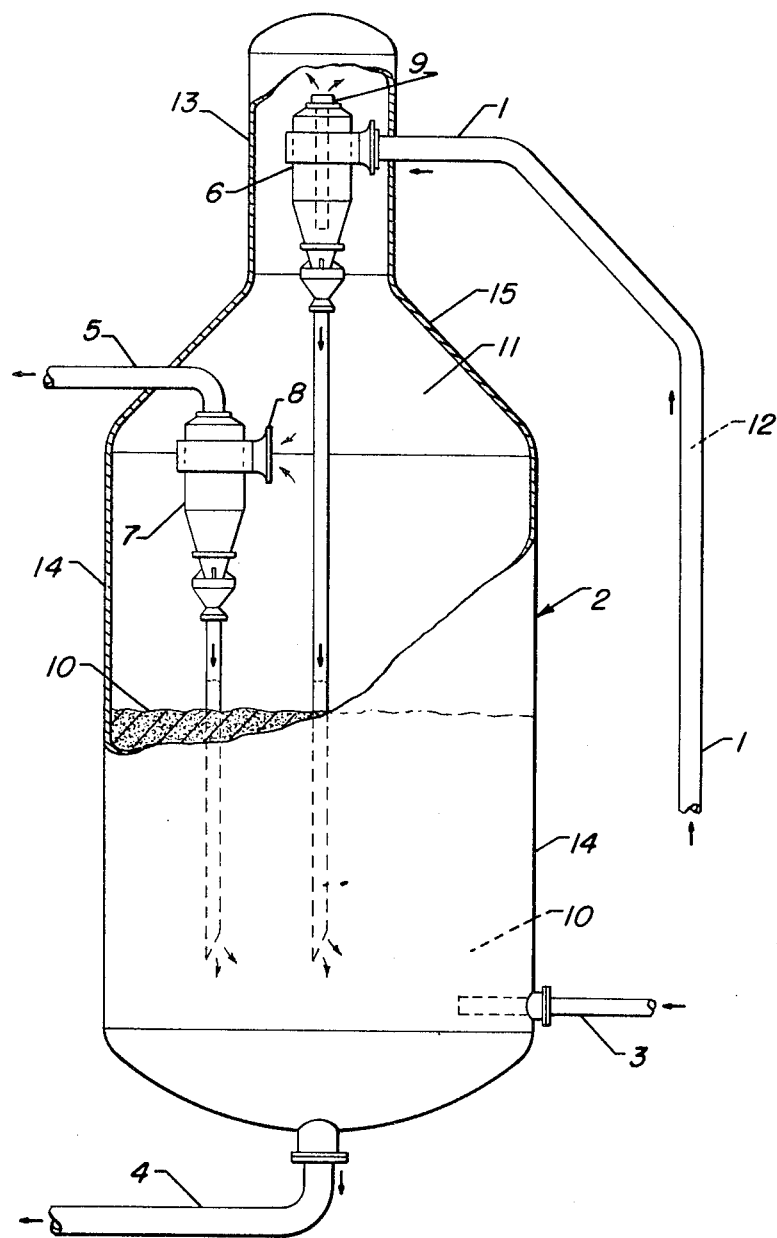
INVENTOR:
Don B. Carson
BY: James R. Hoatson, Jr.
Robert W. Erickson
ATTORNEYS

APPARATUS FOR CATALYTIC CRACKING

BACKGROUND OF THE INVENTION

This invention relates to an apparatus comprising a riser-type reaction zone and a vessel-type reaction zone, said reaction zone vessel having disposed therein a second particle separation means in communication with said reaction zone riser and a first particle separation means in communication with the outlet of said reaction vessel.

DESCRIPTION OF THE PRIOR ART

It has been known for many years that heavy charge stocks such as gas oil, vacuum gas oil, coker gas oil, etc., may be cracked in the presence of a cracking catalyst to produce light hydrocarbons which are rich in olefins and high octane gasoline. In addition, most catalytic crackers are operated at conditions such that heavy product oil is obtained from the reaction zone. The reaction zone product is introduced into a fractionator which separates the products into light hydrocarbons, gasoline, light cycle oil and heavy cycle oil fractions. Typically, the heavy cycle oils are recycled to the cracking reaction zone along with the fresh feed which is passed thereto and are recracked to light hydrocarbon and gasoline products. The light cycle oil products recovered from the cracked products fractionator may be hydrogenated and recycled to the cracking reaction zone. It has been found that catalytic cracking of a hydrotreated light cycle oil, or in some instances a nonhydrotreated light cycle oil or heavy cycle oil over catalyst which has been partially deactivated results in enhanced cracking to desired products in contrast with the products obtained when the light cycle oil is directly contacted with a freshly regenerated catalyst. Although it is not exactly understood, it is believed that the freshly regenerated catalyst contains a number of highly acidic sites which are pacified when the feed stock and the heavy cycle oil are cracked over the freshly regenerated catalyst. In order to take advantage of this phenomenon, the present apparatus is disclosed.

Present day processes for catalytically cracking fresh feed stocks, in which the highly active crystalline aluminosilicates are employed, are tending to require shorter and shorter contact times between freshly regenerated catalyst and the fresh feed stock; the main reason being the reduction in light ends production accompanying the short catalyst-oil contact times. This generally requires that riser-type cracking be effected. The light cycle oils are considered, after hydrogenation, to be readily crackable by catalyst which generally is required to be partially deactivated.

The partially deactivated catalyst is produced after the fresh feed and freshly regenerated cracking catalyst have been in contact for a time sufficient for cracking reactions to take place. Since the partially deactivated catalyst is slightly less active than the freshly regenerated catalyst, in most instances the light recycle oil or in some cases heavy cycle oil which contacts the partially deactivated catalyst can do so in a dense bed reaction zone in which longer catalyst-oil contact times exist. The longer contact times can be tolerated without excess cracking of the recycle oil to low quality dry gas materials.

The present invention allows the refiner to take advantage of the highly active catalyst presently being used by offering an apparatus which allows riser-type cracking to take place and which allows the separation of effluent material from the riser cracker as quickly as possible, in a first cyclone separation zone to reduce the catalyst oil contact times in the riser reactor system while allowing the partially deactivated catalyst separated from the riser reaction zone effluent to contact a recycle stream of light or heavy cycle oils in a dense phase fluidization zone. The effluent materials from both the riser-type reaction zone and the dense phase fluidized reaction zone are commingled and withdrawn through a common cyclone separation zone which generally is of higher efficiency, as far as separation capabilities are concerned, than the cyclone separation zone used to separate the riser-type reaction zone effluent.

The present apparatus allows the refiner to design a smaller dense phase reaction zone because only the recycle portion of the total feed material passing into the process actually goes into that zone for reaction with the dense phase fluidized catalyst located therein. Also, the apparatus disclosed herein allows a reduction in contact time between oil and fresh catalyst in the riser-type reaction zone because the particle separation means located at the upper end of said riser reaction zone quickly separates catalyst and oil which are leaving that reaction zone. This reduces hydrogen transfer between the cracked products and the partially deactivated catalyst. The smaller cross-sectional area of the upper portion of the reaction vessel in which the second particle separation means is located reduces the residence time of the riser reaction zone hydrocarbon effluent in the reaction zone vessel, thereby preventing overcracking of that material to less valuable products.

SUMMARY OF THE INVENTION

It is an object of the present invention to present a cracking apparatus comprising two reaction zones, one reaction zone being an elongated riser-type reaction zone which is directly connected to a second particle separation means which is disposed within a reaction vessel at an upper portion thereof. A first particle separation means is also located in said reaction vessel said first particle separation means having its outlet connected to the outlet of said reaction vessel.

The present invention employs two or more sets of cyclone separators to separate catalyst from fresh feed and recycle feed stocks. More particularly, the present invention employs two sets of particle separation means each of which may comprise a single cyclone separator or a set of cyclone separators which effectively allow separation of catalyst and cracked products from a riser-type reaction zone and a reaction vessel. The particle separation means is employed to separate riser reaction zone cracked products from partially deactivated catalyst removed therefrom in as rapid a manner as possible, without requirement of high separation efficiencies of catalyst and hydrocarbon. The primary reason is that efficiency of separation can be sacrificed as long as a general separation can be effected because the first particle separation means preferably has higher separation efficiencies and separates catalyst and hydrocarbon effluent from both the riser reaction zone and the second reaction zone vessel which pass into the first particle separation means before leaving the reaction vessel.

The reaction zones and the separation zones along with all inlet and outlet lines and all transfer lines included as part of the apparatus of the present invention can be constructed from any suitable material. The metals used in the construction of the various parts of the apparatus should be of such a nature as to withstand temperatures greater than 600° F., and not be easily worn away by contact with the small particle size catalyst. Typical of the metals which can be used include carbon steel with erosion resistant linings, stainless steel metals and various metals derived therefrom including metals containing chromium and nickel.

BRIEF DESCRIPTION OF THE DRAWING

The apparatus depicted in the accompanying drawing shows large reaction vessel 2 containing cyclones 6 and 7. Reaction vessel 2 can be of any general shape, preferably a cylindrical and elongated vessel, although other size and shape vessels may be used but the requirement of a smaller cross-sectional area at its upper portion must be met to reduce the residence time in vessel 2 of hydrocarbon material flowing from cyclone 6 to cyclone 7. The reaction vessel 2 contains an outlet at a point which is higher than inlet 3 at the lower portion of the vessel 2. This allows the effluent from vessel 2 which comprises cracked recycle oils and cracked fresh feed to be withdrawn relatively free of catalyst particles present in the lower portion of vessel 2 as a dense phase and represented by number 10 of the drawing. Reaction vessel 2 contains outlet 4 at its lowermost portion through which deactivated catalyst which has previously contacted fresh feed stock and recycle oil is passed to a regeneration means. The spent catalyst is withdrawn from line 4 and can be passed through a regeneration zone wherein the catalyst is contacted with an oxygen-containing stream at high temperatures to allow ignition to take place which allows burning of carbon from the spent catalyst. The regenerated spent catalyst can be contacted with the fresh feed and passed into riser reaction zone 1 at its lowermost portion to effect cracking of the fresh feed material. The riser reaction zone 1 is located externally to reaction vessel 2 and is connected to a particle separation means which is located at an upper portion thereof. As indicated in the attached drawing, separation means 6 is located at the upper portion of vessel 2, which as indicated by number 13, has a relatively smaller inside cross-sectional diameter than the portion of the vessel where separation means 7 is located, indicated by number 14 of the drawing.

The relatively wider portion of the reaction vessel 2, where separation means 7 is located, is essential to this apparatus in order to allow the superficial velocity of hydrocarbon passing up through the dense of catalyst which is located at the bottom portion of the reaction vessel 2 (indicated by number 10 of the drawing) to be at a sufficiently low value to entrain a minimum of catalyst from the dense phase fluidized bed of catalyst. The larger the diameter of the reaction vessel at the portion of the vessel where the dense phase fluidized bed is, the greater the amount of hydrocarbon that can be fed through the catalyst bed before catalyst entrainment occurs.

The portion of the apparatus indicated by number 13 on the drawing is the relatively smaller diameter portion of vessel 2. Separation means 6 is located in the narrower portion of vessel 2. The effluent material from riser 1 flows from separation means 6 which is located within vessel 2 to separation means 7 which is also located within vessel 2. In order to reduce the residence time of the effluent material passing between separation means 6 and 7, vessel 2 is constructed with the aforementioned narrow portion. The narrow portion of the vessel reduces the volume within vessel 2 which surrounds cyclone separation means 6 and decreases the time required for hydrocarbon effluent material to flow from cyclone 6 and 7.

The riser reaction zone 1 is connected to the upper portion of vessel 2 through a wall portion of the vessel and preferably the narrow portion of vessel 2. As is known in the art, riser-type reaction zones are designed with high length over diameter ratios and in the present case riser 1 should have that basic character. Riser 1 may vary in length from a few feet to up to about 100 feet, with diameters of from a few inches up to about a few feet and preferably is a substantially straight and vertical member of the disclosed apparatus. The riser is designed so that freshly regenerated catalyst and feed stock can be introduced at the lower portion of the riser and carried upwards by the vaporized feed stock in an essentially dilute phase fluidized manner.

Vessel 2 is generally smaller in length than riser 1 but larger in diameter. The overall length of vessel 2 from its spent catalyst outlet 4, which is located at the bottom of the vessel, to its uppermost portion is generally from about 6 up to about 60 feet with the vessel diameter varying from about a few feet up to about 20 feet.

The portion of vessel 2 shown on the drawing as number 15 is the sidewall portion which connects the upper and more narrow and, lower and wider sections of the vessel. This section is preferably designed to allow smooth flow of catalyst and oil from the upper to the lower portion of the vessel. The ratio of diameters of vessel 2 indicated at its sidewall portions 14 and 13 should be greater than about 1.5.

Line 3 which is located at a lower portion of vessel 2 is an inlet line through which a recycle stream made up of hydrotreated or unhydrotreated light cycle oil or heavy cycle oil may be passed to be contacted with the dense phase fluidized bed of catalyst in vessel 2. Additionally catalyst may be in admixture with the hydrocarbons passing into vessel 2 via line 3. The catalyst may come from a regeneration zone and inlet 3 may be the outlet portion of a second riser-type reaction zone similar in characteristics to riser 1, previously described.

Cyclone separators are familiar to those in the art of catalytic cracking especially fluidized catalytic cracking and is not felt that a detailed explanation of their operation is required; however, it is required that cyclones be properly sized and used in a manner so that there is a separation of hydrocarbons and finely divide catalyst materials. The cyclone separators may be used singularly; that is, one cyclone separator to separate the catalyst and cracked products from the riser reaction zone, or a number of cyclone separators connected in series or in parallel or both and all attached to the riser reaction zone effluent stream. A second cyclone separator through which is passed a stream containing a commingled mixture of recycled cracked products and the fresh feed cracked products in a similar manner may contain one or more cyclone separators arranged in series or parallel arrangement or both and with an exit or outlet stream leaving the cyclone separator or separators through a sidewall or the top portion of the reaction vessel 2. In this manner there is a sole outlet stream 5 from reaction vessel 2 containing both recycle oil and cracked feed stream products.

DESCRIPTION OF AN EMBODIMENT

An embodiment of the present invention resides in an apparatus comprising an elongated riser cracking reaction zone having a fresh feed and regenerated catalyst inlet at the lower end of said riser and a first cyclone separation zone at the upper end of said riser, said first cyclone separation zone being disposed within a second reaction zone vessel, said vessel having a feed inlet and an effluent outlet, said effluent outlet being connected to a second cyclone separation zone also disposed within said second reaction zone vessel, said second cyclone separation zone having its inlet located within said second reaction zone vessel.

I claim as my invention:

1. An apparatus system for effecting the fluidized catalyst contacting and catalyst separation from two different hydrocarbon charge streams in a manner precluding excess catalyst contact time with one of the streams, which apparatus comprises in combination, a vertically disposed reaction vessel adapted to retain a fluidized bed of catalyst particles, an inlet to said vessel for receiving a first hydrocarbon charge stream, a first particle separator means in the upper portion of said vessel positioned to remove entrained particles from said first hydrocarbon charge stream and return said particles to said bed maintained therein, a hydrocarbon stream outlet from said first particle separator and from said vessel, a vertical riser reaction section separate from said reaction vessel and having a lower inlet means to receive a second hydrocarbon charge stream and catalyst particles, a second particle separator means in the upper end portion of said vessel and connecting to the upper end portion of said riser section, with said second particle separator means having a catalyst discharge section to said catalyst bed in said vessel and in addition having a hydrocarbon stream discharge which discharges into the interior of said vessel to effect a commingled discharge with effluent material from said catalyst bed through said first particle separator, without contacting the second hydrocarbon charge stream within the fluidized bed of catalyst located within said vessel.

2. The apparatus of claim 1 further characterized in that said first hydrocarbon charge stream inlet is located at a lower portion of said reaction vessel.

3. The apparatus of claim 1 further characterized in that said catalyst outlet from said vessel is located at a lower portion of said vessel.

4. The apparatus of claim 1 further characterized in that said second particle separation means is located in a portion of said vessel having a smaller inside cross-sectional area than the cross-sectional area of the vessel at its lower portion.